United States Patent

[11] 3,562,437

[72] Inventors Pierre R. L. Marty
Paris;
Roger L. Dousset, Seine, France
[21] Appl. No. 711,580
[22] Filed Mar. 8, 1968
[45] Patented Feb. 9, 1971
[73] Assignee International Standard Electric Corporation
New York, N.Y.
a corporation of Delaware
[32] Priority Mar. 13, 1967
[33] France
[31] 98472

[54] CONDITION SENSING CIRCUIT FOR TELEPHONE SUBSCRIBERS' LINES

4 Claims, 1 Drawing Fig.

[52] U.S. Cl. 179/18
[51] Int. Cl. H04m 3/22
[50] Field of Search 179/18.3, 18.3A

[56] References Cited

UNITED STATES PATENTS 3,284,576 11/1966 York 179/18(.3A)
3,231,680 1/1966 Yamato et al. 179/18(.3)

*Primary Examiner*—Kathleen H. Claffy
*Assistant Examiner*—Thomas W. Brown
*Attorneys*—C. Cornell Remsen, Jr., Delbert P. Warner, Charles L. Johnson, Jr., James B. Raden, Walter J. Baum, Paul W. Hemminger and Marvin M. Chaban

ABSTRACT: Subscriber junctors for semielectronic telephone exchanges. The junctor, instead of using relays, utilizes a terminal crossbar switch. The subscriber lines are connected to the verticals of the crossbar switch through inlet connections. The verticals of the crossbar switch split into two separate parts. The lines are connected directly to the vertical of the first part. A first group of outlets on the first part of the crossbar switch is directly accessible from the inlets of the first part and leads towards common equipment in the exchange. An observation circuit is in series with each of the verticals where the crossbar switch is split. The observation circuit is sensitive to currents flowing along the lines when the lines are looped. Thus, the observation circuits on being scanned determine whether the associated line circuit is looped. There are two outlets on the second part of the crossbar switch. One leads to a current supply circuit for idle lines. The second leads to a current supply circuit for lines in a "false call" condition. Scanners connected to the second part of the switch determine whether the line is idle or free. The information secured by the scanners of the first part of the switch and the second part of the switch indicates whether the line is idle, busy or in a "false call" condition.

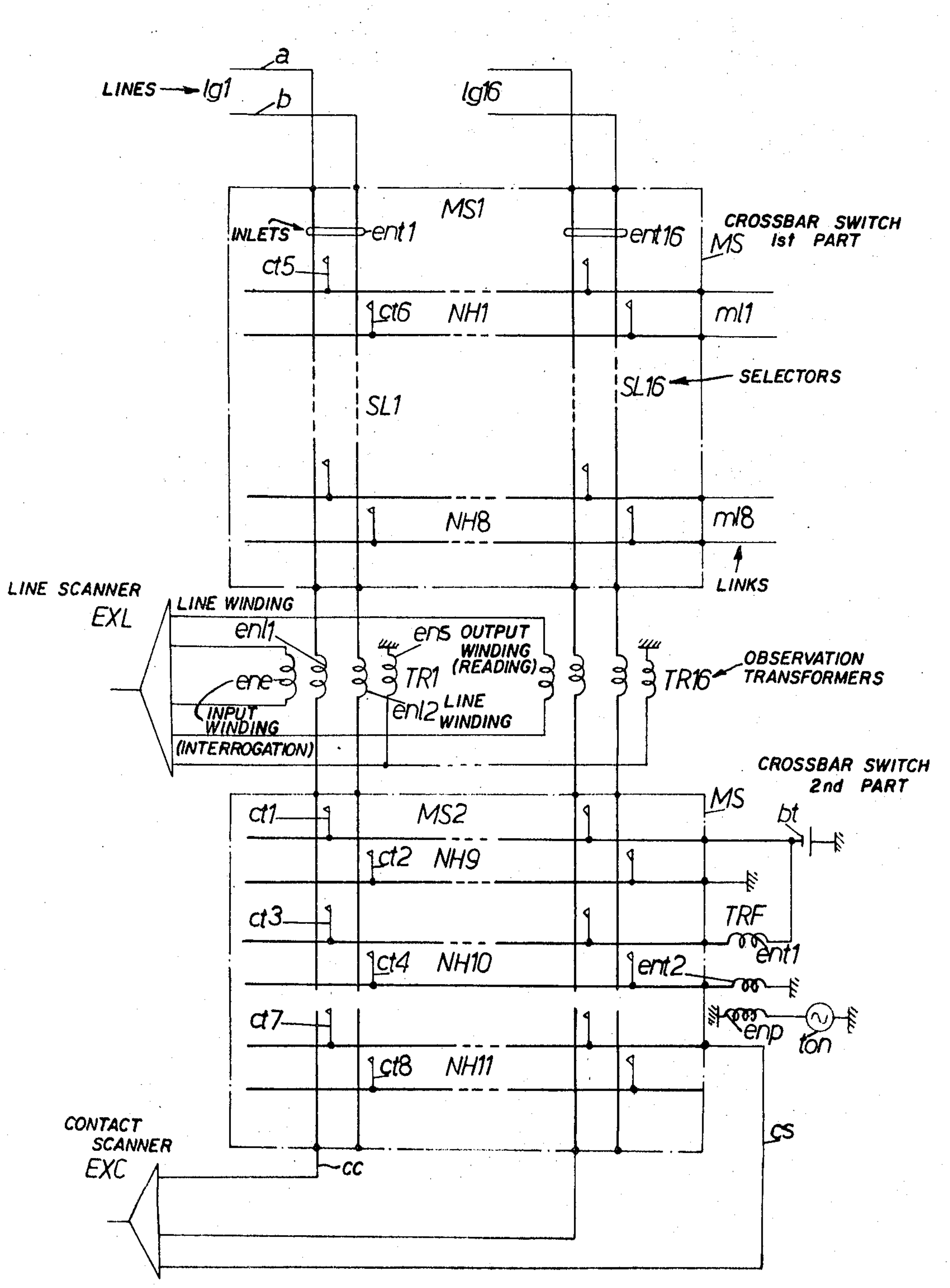
LINES
lg1
a
b
lg16
MS1
INLETS
ent1
ent16
CROSSBAR SWITCH 1st PART
MS
ct5
ct6
NH1
ml1
SL1
SL16
SELECTORS
NH8
ml8
LINKS
LINE SCANNER
EXL
LINE WINDING
enl1
ens
OUTPUT WINDING (READING)
ene
TR1
TR16
OBSERVATION TRANSFORMERS
INPUT WINDING (INTERROGATION)
enl2
LINE WINDING
CROSSBAR SWITCH 2nd PART
MS2
ct1
bt
ct2
NH9
ct3
TRF
ent1
ct4
NH10
ent2
ct7
enp
ton
ct8
NH11
CONTACT SCANNER
EXC
cc
cs

CONDITION SENSING CIRCUIT FOR TELEPHONE SUBSCRIBERS' LINES

The present invention concerns improvements to selection systems for circuits or electrical equipment, and, more particularly, to an individual unit for a line such as a line junctor connected to a switching center, such as a telephone exchange, for instance.

In certain telephone systems, a line is connected to the common units of the exchange only when it requires a service (when it is part of any type of call). When no service is requested for it, it is disconnected from the common units and is connected to an individual unit. The individual units are scanned periodically for detecting the changes in condition of the lines. This makes it possible to immobilize the common units, at the service of a line, for only the shortest possible time, so as to obtain savings on their number because they are costly. But the line individual-unit must, on its part, also be as economical as possible.

Two cases are to be distinguished wherein a line may happen to be disconnected from the common units of the exchange and connected to its individual unit: on the one hand when the line is free, that is to say not looped—the subscriber's handset being on its cradle; and, on the other hand, whenever the line is said to be in "false call" condition, say for instance after the ending of a telephone conversation, when the called party has already replaced his handset whereas the line concerned is still looped, or immediately after the call, when the called subscriber's line is found to be busy.

In the first case, the absence of a loop is the normal condition, and, the appearance of a loop means that the subscriber has just lifted his handset for a new call. In the second case, the presence of a loop is the normal condition, and, the removal of the loop indicates that the subscriber has just replaced his handset and that his line now becomes free. Both cases therefore must necessarily be differentiated so as to enable the correct interpretation of the conditions of the line.

The observation of the condition of the line is effected in the individual unit. It is consequently desirably, in order to simplify the processing of the information which characterizes the condition of the line, that the discrimination between the two cases, line free or in "false call" condition, should also be made in the individual unit.

Subscribers line-individual-units are already known which meet these conditions and are realized with the help of electromechanical relays the contacts of which enable, on the one hand, to connect to the line the supply-and-observation circuits, and, on the other hand, to signal if the line is free or in "-false call" condition. However, the present tendency is to avoid use of electromechanical relays as much as possible, and to design exchanges so-called "semi-electronic," in which the connection network uses electromechanic selectors whereas all the other circuits, or almost all, are realized with the help of electronic components.

The present invention has for one of its objects the provision of an individual-unit for a line connected to a switching center, meeting the conditions mentioned above and realized in simple and economical fashion, without utilizing relays.

A more particular object of the invention is to provide individual line units comprising, selectors having a first inlet to which the line is directly connected, and a first group of outlets directly accessible from the first inlet leading towards common units of the switching center. A second inlet of the selector is provided onto which the line is connected through an observation circuit that is sensitive to the current flowing along the line when it is looped. A second group of at least two outlets is provided. The outlets are accessible from the second inlet and lead to a supply circuit for free lines, and to a supply circuit for lines in "false call" condition respectively. The arrangement makes it possible to observe the condition of the line, by means of the observation circuit, when it is free and connected to the first outlet of the second group of outlets, and also when it is in "false call" condition, and connected to the second outlet.

According to a feature of the invention, the selector is an integral part of a crossbar switch.

According to another feature of the invention, the selector comprises an inlet-multipling that is divided into two parts between which is connected the observation circuit. The first part, onto which the line is directly connected, gives access to the outlets leading towards common units. The second part, to which the line is connected through the observation circuit, gives access to the supply circuits.

According to another feature of the invention, the selector comprises—in addition to the connection points used to connect the inlets to the outlets mentioned above—at least one additional normally open connection point that is separately wired. The additional connection point is closed when the line is in "false call" condition; so as to enable the interpretation of the "line not looped" and "line looped" conditions.

According to another feature of the invention, the observation circuit comprises, mainly, a saturable-core transformer having at least one winding through which the line-current flows, one interrogation winding and one reading winding. The windings are arranged that when a signal is given to the interrogation winding the reading winding does not render any signal if the core is saturated by the line-winding which occurs when the line is looped and when a current flows through it. The reading winding provides a reading signal when, on the contrary, the line is not looped.

Different other features of the invention will become apparent from the description that follows, given by way of nonlimiting example, in conjunction with the accompanying FIGURE representing an embodiment of the present invention.

In this embodiment, a group of 16 lines, *lg*1 to *lg*16, is connected to the inlets *ent*1 to *ent*16 of a crossbar switch MS having 16 selectors, SL1 to SL16, arranged vertically. Each selector controls 11 pairs of contacts corresponding to 11 selection levels, NH1 to NH11.

As can be seen in the FIGURE, the multiswitch MS is divided into two parts, MS1 and MS2. The first part groups the 8 first levels, NH1 to NH8. It enables connecting the lines to the common units such as the register, translators, etc. of an exchange, through the links *ml*1 to *ml*18. For connection of the line *lg*1 to the link *ml*1, for instance, the multiswitch MS is so controlled that the contacts *ct*5 and *ct*6 should close. The multiswitch MS can be of any type and its control circuits do not form part of the present invention.

The second part of the multiswitch MS groups the three last levels, NH9 to NH11. The lines are connected to the levels NH9 and NH10 through observation transformers TR1 to TR16. This is accomplished simply by cutting the vertical multipling of the selectors between the levels NH8 and NH9 in order to insert the observation transformers. The level NH9 makes it possible to connect the lines to a supply circuit for free lines. The level NH10 makes it possible to connect the lines to a supply circuit for the lines in "false call" condition. The level NH11 has received a particular function of discrimination, as will be seen subsequently.

Now the circuits will be described in more detail, by considering in particular the line *lg*1; but it is quite evident that the other lines are processed in exactly the same manner.

When the line *lg*1 becomes free, after having been in a whatever condition, the multiswitch MS receives an order from central control equipment such as a marker, for example, which releases every connection established beforehand by SL1 and which controls the connection on the level NH9. The contacts *ct*1 and *ct*2 close. All the other contacts of the selector SL1 are then open. The line *lg*1 is supplied by the following circuit: ground potential, battery *bt*, contact *ct*1, winding *enl*1 of transformer TR1, wire *a*, wire *b*, winding *enl*2 of transformer TR1, contact *ct*2, ground potential.

The supply circuit for free lines is simply made up of a ground potential and a battery connected to the two conductors of the level NH9. The line *lg*1 is current-supplied by the battery *bt*, but, since it is free, the conductors *a* and *b* are not looped and no current flows.

The observation transformer TR1 of line *lg*1 has four windings, the two line windings *enl*1 and *enl*2 already mentioned, an input winding *ene* and an output winding *ens*. The windings *ene* and *ens* of all the observation transformers are connected to a line scanner EXL. When it is required to know the condition of the line *lg*1, the scanner EXL sends a signal (for instance a current-impulse), upon winding *ene*, and observes the response of winding *ens*. The transformer TR1, as was already mentioned, is a saturable-core transformer. As long as line *lg*1 is free, the windings *enl*1 and *enl*2 have no current flowing through them and the core of the transformer is not saturated. An impulse provided to the winding *ene* inducts therefore a voltage to the terminals of winding *ens*. This voltage is detected in the scanner EXL and characterizes the fact that the line is not looped.

This is not enough however. It is also necessary to know whether the line is free or in "false call" condition in order to interpret the information as to the condition of the line provided by the scanner EXL. For this purpose, one contact per line has been provided, in the level NH11, such as *ct*7 for the selector SL1 and the line *lg*1. This contact is open when the line is free. It is also open when the line is connected to the common units of the exchange, but this case will be explained subsequently. The position of the contacts such as *ct*7 is detected by the contact scanner EXC.

When it is required to know the condition of the line *lg*1, the scanner EXC is therefore orientated, at the same time as the scanner EXL, in such manner as to send a signal onto the contact *ct*7, along one of the vertical-multipling conductors *cc* of the selector SL1. This conductor does not go beyond the level NH11, the multipling being cut between levels NH10 and NH11. Since the line is supposed to be free, the contact *ct*7 is open, as was mentioned above; so, the signal sent by the scanner EXC does not reach the output conductor *cs* of the level NH11, and does not return to the scanner EXC. Absence of any signal along conductor *cs* indicates that the line is free.

In gathering together the information provided by the scanners EXL and EXC, it is then possible to establish that the line *lg*1 is free and is not looped. It happens to be, therefore, in the normal condition of a free line, which does not require any processing.

It will now be assumed that the subscriber of line *lg*1 lifts his station's handset. The line wires *a* and *b* are looped in his telephone-set. Due to this, a current starts flowing; it flows through the windings *enl*1 and *enl*2 of transformer TR1. The core of transformer TR1 is thus saturated.

When it is required to know the condition of line *lg*1, the scanners EXL and EXC are orientated as previously. The scanner EXC indicates that the line *lg*1 is free; i.e., not connected to common equipment. However, the impulse transmitted by the scanner EXL to the winding *ene* of transformer TR1 is practically without any effect on winding *ens*, since the core of this transformer is already saturated. The winding *ens* does not provide any voltage and the scanner EXL, consequently, provides an information indicating that the line *lg*1 is looped. In assembling the information provided by both scanners, it is possible to establish that line *lg*1 is free and that it is looped. This is therefore the case of a calling line which has to be processed, the corresponding orders being able to be established from the information provided by the scanners.

Consider now the case wherein the line *lg*1, after detection of the call as was just described above, for instance, is connected to the common units through the link *ml*1 connected to the level NH1 of the multiswitch MS. For connection of line *lg*1 to the link *ml*1, the multiswitch MS receives an order which releases any possibly established connection, and which establishes a connection on the level NH1. The contacts *ct*5 and *ct*6 close and the line-wires *lg*1 are connected to those of the link *ml*1. All the other contacts of the selector are open, this cancels any pickup along the line-wires. The contacts *ct*1 and *ct*2 are in fact open and it will be noted that the line-windings of the transformer TR1 are then isolated. The core of the transformer TR1 ceases therefore to be saturated and, if its condition happens to be observed, with the help of scanner EXL, a return signal is received on *ens* and, due to this, everything takes place as if the line was not looped. It is a first element of information. Moreover, the contact *ct*7 is open and the contact scanner EXC gives the same information as if the line was free. The assembling of the information provided by both scanners makes it possible therefore to consider a line, connected to the common units, as a noncalling free line and not any processing.

There now remains to explain the case of a line in "false call" condition. It will be assumed that the subscriber of line *lg*1, after being connected to the common units, has obtained a call, and, that this call would end up with the other party replacing his handset. The subscriber of line *lg*1 has not yet replaced his handset, so that his line is looped.

In such a case, the common units release and the multiswitch MS receives an order which causes the release of the connection previously established (to the link *ml*1) and terminates the connection on the levels NH10 and NH11 simultaneously.

The line *lg*1 is then current-supplied by the following circuit: earth potential, battery *bt*, winding *ent*1 of transformer TRF, contact *ct*3, winding *enl*1 of transformer TR1, wire *a*, line *lg*1, wire *b*, winding *enl*2 of transformer TR1, contact *ct*4, winding *ent*2 of transformer TRF, earth potential. The line *lg*1 is therefore supplied with direct current through the battery *bt*, like a free line. Moreover, the winding *enp* of transformer TRF, current-supplied by the tone generator *ton*, inducts on the windings *ent*1 and *ent*2 a voice frequency current or tone, transmitted along the line wires, in order to inform the subscriber to replace his handset.

The line *lg*1 being looped, the windings *enl*1 and *enl*2 saturate the core of the transformer TR1. Observation of the line *lg*1 by means of the scanner EXL indicates therefore that it is looped. However, the connection has caused the closing of contacts *ct*7 on the level NH11. So, the scanner EXC, at the same instant, finding the contact *ct*7 closed and receiving a signal along conductor *cs*, provides a particular indication signifying that the line is in "false call" condition.

In assembling the information provided by the two scanners, it is possible to establish that the line *lg*1 is in "false call" condition and that it is looped, which is the normal condition of a line in "false call" condition.

When subscriber of the line *lg*1 replaces his handset, after being in "false call" condition, his line ceases to be looped and the core of transformer TR1 ceases to be saturated. A subsequent observation of the line *lg*1 will therefore make it possible to establish that the line is in a "false call" condition (scanner EXC finding the contact *ct*7 closed) and that it is no longer looped. This fact is then signalled to the exchange control equipment and the multiswitch MS receives consequently an order causing the release of the previous connections and the establishing of the connection upon the level NH9, the line being now free.

It will be seen that nothing differentiates a nonlooped free line (connection at level NH9) from a busy line (connection onto one of the levels NH1 to NH8). The necessary information can be stored in the common units of the exchange and namely into a memory associated with these common units. In fact, this information is only useful to the common units for establishing the calls intended for the line and it was just seen above that it was not necessary during the periodical scanning of the line.

On the other hand, the device just described above also makes it possible to connect a line to no level whatsoever, that is to say, to isolate it completely; this can be deemed necessary for the lines through which abnormal currents flow, or, for any other reason. There can also be imagined various alternatives of utilization of the individual-line equipment, object of the present invention.

It is understood the foregoing description of a specific embodiment of this invention is made by way of example only and is not to be considered as a limitation on its scope. The numerical values were only given, namely, to facilitate the description and can be changed with every case of application.

We claim:

1. In a telephone exchange, a plurality of line junctor units each comprising a switching device, said switching device having selector means therein, said selector means being split to cause said switching device to have a first part and a second part, first inlet means coupled to the selector means of said first part of said device, a plurality of telephone subscriber lines coupled directly to said first inlet means, outlet means in said first part individually connectable to particular ones of said selector means whereby said individual lines can be connected to common equipment in said exchange through said outlet means, second inlet means coupled to the second part of each switching device, observation circuit means serially connected between the first and the second inlet means, at least first and second outlets connectable to said selector means of said second part for coupling first and second power supplies, respectively, to selected lines, said first power supply being used for supplying power to free lines, said second power supply being used for supplying power to "false call" lines, and said observation circuit means responsive to current generated by said first power supply to detect when a selected line is looped responsive to a telephone of said telephone subscriber line going into an off-hook condition.

2. The invention as claimed in claim 1, wherein said switching device is a crossbar switch having vertical and horizontal multiples, said selector means comprises said vertical multiples of said crossbar switch, and said outlets are coupled to said horizontal multiples.

3. The invention as claimed in claim 2, wherein additional horizontal multiples are provided in the second part of said switching device for connecting the verticals of said second part to contacts between said vertical multiples and said additional horizontal multiples, said contacts being normally open and separately wired, said contacts being in a closed position when a line is in a "false call" condition, and wherein there are scanner means operable in conjunction with said observation circuit means for determining the position of said contacts, whereby the "false call" condition of the line is determinable by the response of said observation circuit means to the power level supplied thereto.

4. The invention as claimed in claim 2, wherein said observation circuit means comprises a saturable core transformer, said transformer having at least one line current winding through which line current flows, an interrogation winding through which an interrogation signal is applied, and a reading winding for responding to said interrogation signal, said windings being arranged so that when an interrogation signal is given to the interrogation winding the reading winding is precluded from providing an output signal when the core of said transformer is saturated by current through the line current winding in response to the line connected thereto being looped and coupled to said first power supply, said observation circuit means further comprising scanning means for determining whether an output signal is provided by said reading winding in response to a signal on said interrogation winding whereby the looped condition of the line is determinable.